United States Patent [19]

Vought et al.

[11] Patent Number: 5,666,794
[45] Date of Patent: Sep. 16, 1997

[54] FLAIL MOWER ATTACHMENT FOR A SKID STEER VEHICLE

[75] Inventors: Michael Lee Vought, Grove City; Harlan Arthur Palm, Paynesville, both of Minn.

[73] Assignee: Palm Sales, Inc., Grove City, Minn.

[21] Appl. No.: 561,394

[22] Filed: Nov. 21, 1995

[51] Int. Cl.[6] .................................................. A01D 34/42
[52] U.S. Cl. .................... 56/15.2; 56/504; 56/DIG. 9; 172/112; 172/45; 37/403
[58] Field of Search ........................ 56/15.2, 504, 505, 56/DIG. 9, 294, 10.7, 12.7, 2, 7; 172/112, 47, 30, 123, 45, 125; 37/403, 468; 414/686

[56] References Cited

U.S. PATENT DOCUMENTS

| | | | |
|---|---|---|---|
| 3,646,733 | 3/1972 | Clapsaddle, Jr. | 56/15.2 X |
| 3,672,521 | 6/1972 | Bauer et al. | |
| 3,754,603 | 8/1973 | Bogle | 56/294 X |
| 3,802,172 | 4/1974 | Mathews | 56/504 X |
| 3,884,019 | 5/1975 | Gerzanich | 56/504 X |
| 4,023,604 | 5/1977 | Stadnick | 56/504 X |
| 4,055,262 | 10/1977 | Bauer et al. | 214/140 |
| 4,060,261 | 11/1977 | Bauer et al. | 280/756 |
| 4,117,944 | 10/1978 | Beckstrom et al. | |
| 4,126,989 | 11/1978 | Oosterling et al. | |
| 4,150,474 | 4/1979 | Bauer et al. | 29/463 |
| 4,150,504 | 4/1979 | Asche | 37/403 |
| 4,243,356 | 1/1981 | Takojima | 37/403 X |
| 4,279,566 | 7/1981 | Sagaser et al. | 414/686 |
| 4,436,477 | 3/1984 | Lenertz et al. | 37/403 X |
| 4,480,955 | 11/1984 | Andrews et al. | 37/403 X |
| 4,878,713 | 11/1989 | Zanetis | 299/39 |
| 4,945,662 | 8/1990 | Kreye | 37/403 |
| 4,976,054 | 12/1990 | Jones | 172/821 X |
| 5,004,398 | 4/1991 | Wagner et al. | 414/723 |
| 5,120,186 | 6/1992 | Jorgenson | 414/686 |
| 5,127,172 | 7/1992 | Lund et al. | 37/403 |
| 5,234,282 | 8/1993 | Osborn | 37/403 X |
| 5,419,104 | 5/1995 | Higdon | 56/15.2 X |
| 5,435,117 | 7/1995 | Eggena | |
| 5,485,718 | 1/1996 | Dallman | 56/294 |
| 5,526,590 | 6/1996 | Palm et al. | 37/142.5 |

OTHER PUBLICATIONS

Beaver P10 Flail Cutter Brochure Jan.1987.

Primary Examiner—Terry Lee Melius
Assistant Examiner—Victor Batson
Attorney, Agent, or Firm—Patterson & Keogh, P.A.

[57] ABSTRACT

An improved skid steer vehicle that has a longitudinally extending main frame and wheels for supporting the main frame for movement over the ground. An operator's compartment spans substantially the entire lateral distance of the main frame in the fore and aft midportions thereof, An engine is contained within an engine compartment disposed rearward of the operator's compartment and includes an auxiliary hydraulic power supply driven off the engine. A pair of spaced apart actuating arms are operably coupled to the main frame at a first end and have a quick attaching mount disposed at a second end thereof. The improvement comprises a flail mower implement that has a quick attachment receiver that is adapted for selective engagement with the quick attaching mount of the pair of actuating arms.

20 Claims, 3 Drawing Sheets

FLAIL MOWER ATTACHMENT FOR A SKID STEER VEHICLE

BACKGROUND OF THE INVENTION

The present invention relates generally to a flail mower attachment for skid steer vehicles. In particular, the present invention is a hydraulically powered flail mower that may be readily attached to the front of the skid loader vehicle and detached therefrom as desired.

Skid steer vehicles are compact, highly maneuverable vehicles which are maneuvered by an operator seated within an operator compartment by actuating a pair of steering levers, typically positioned to the left and right sides of the operator. The left lever controls the rotation of the pair of wheels on the left side of the skid loader vehicle and the right lever controls the rotation of the pair of wheels on the right side of the skid loader vehicle. The extent to which each lever is pushed in the forward direction controls the forward speed at which the wheels on that side of the vehicle rotates. Similarly, the extent to which the lever is pulled in a reverse direction controls the speed at which the wheels on that side of the vehicle are rotated in a reverse direction. When a lever is in the centered neutral position, the wheels on the associated side do not rotate. The levers are typically biased to the neutral position.

Steering is accomplished by the differential speeds of the two wheels on one side of the vehicle as compared to the two wheels on the other side of the vehicle. Typically, two of the wheels are rotating and two are skidding or rotating in the opposite direction in order to effect a vehicle turn around the skidding wheels or reversing wheels. This type of steering substantially digs up the soil on which the skid steer vehicle is operating. The use of skid steer vehicles is usually limited to areas in which such disturbance of the soil is not a concern, such as roadbeds and construction sites. Use of skid steer vehicles on lawns and other decorative turf is generally avoided.

Attachments such as an auger, a grapple, sweeper, landscape rake, snowblower or backhoe, some of which may include their own hydraulic motor, are sometimes mounted to a boom assembly on the front of the skid steer loader. An auxiliary hydraulic system is used to control the flow of hydraulic fluid between the skid steer vehicle auxiliary hydraulic pump and the hydraulic motor on the front mounted attachment and is used to actuate hydraulic cylinders that position the front mounted attachments. Attachments such as scarifiers or stabilizers are sometimes mounted to the rear of the loader and may be positioned by the use of hydraulic cylinders actuated by means of the auxiliary hydraulic system.

A rotary mower has been shown adapted for use with a skid steer vehicle as described in U.S. Pat. No. 5,435,117. This type of adaption has not been fully satisfactory. In order to get a 60 inch cut, which is seen to be the minimal cut that is considered desirable, the dimension of the mower housing must be at least 72 inches in width and length. As depicted in FIG. 2 of the '117 patent, the great length of the rotary mower housing projects a great distance in front of the skid steer vehicle. Such rotary mowers weigh as much as fifteen hundred pounds. Such weight greatly destabilizes the very short wheelbase skid steer vehicle when the rotary mower is raised, as depicted in FIG. 2 of the '117 patent.

Additionally, rotary mowers are known to present serious missile hazards to personnel as a result of the very high tip speeds and the substantial mass of the rotating blades. Rocks and other debris will carry substantial distances at high velocity, propelled by a blade tip, thus necessitating an automatic cutoff as disclosed in the '117 patent. Even with a cutoff, the inertia of the rotating blades will cause them to continue to rotate at relatively high rotational speeds for as much as a minute, even after the flow of hydraulic fluid is cut off, unless the blades are actively braked. The blades continue to pose a hazard even after hydraulic flow cutoff.

There is a need to mow vegetation in an overgrown area where construction is going to be performed prior to commencement of the construction operations. In the past, special mowers and tractors were brought in to the site to mow the vegetation prior to commencement of the construction operations. This entails the expense and inconvenience of bringing in special equipment to perform a single preparatory mowing operation. If, during the construction operations, a second mowing was needed, the special equipment would have to be returned. Skid steer vehicles typically remain at the construction site to perform a variety of tasks using different attachments for the duration of construction operations.

It would be a decided advantage in the industry if the additional operation and expense in site preparation associated with bringing in special mowing equipment could be avoided. The mowing that is performed at the site should be the safest operation possible. Additionally, the mower should be readily available at the site to perform subsequent mowing operations as needed after the initial mowing operations.

SUMMARY OF THE INVENTION

The flail mower attachment of the present invention substantially meets the aforementioned needs. A skid steer vehicle that is already at the construction site to perform other excavation operations utilizing attachments such as the aforementioned attachments can do the mowing site preparation work with the flail mower attachment of the present invention. This avoids the need to truck in special mowers to do the mowing preparation. Such preparation does not require the care that is necessary in mowing lawns and other decorative turf, so that the damage to the soil done by the skid type steering of the skid steer vehicle is not a factor, making the flail mower attachment of the present invention very useful and cost effective.

Additionally, a flail mower is inherently safer from a missile hazards standpoint than a rotary mower. The tip speeds of the cutting hammers of the flail mower are greatly reduced as compared to the tip speeds of the rotary blades. Further, the mass of the individual hammers is only a small fraction of the mass of the rotary blades, making it much less likely that the hammer is able to impart a substantial velocity to a rock or other debris. Further, the blades of the rotary mower operate in a plane that is parallel to the surface of the ground, which tends to eject rocks out from under the mower housing, parallel to the ground in all directions. The hammers of the flail mower operate in a plane that is transverse to the surface of the ground. Any rocks picked up by the flail mower will be thrown to the rear of the flail mower and under the skid steer vehicle, presenting a substantially reduced missile hazard as compared to the rotary mower.

The flail mower is a much more compact unit than is the rotary mower. While the flail mower has a weight that is comparable to the rotary mower, the compactness of design results in a substantially reduced destabilizing effect on the skid steer vehicle when the flail mower is raised.

An improved skid steer vehicle in accordance with the present invention has a longitudinally extending main frame and wheels for supporting the main frame for movement over the ground. An operator's compartment spans substantially the entire lateral distance of the main frame in the fore and aft midportions thereof. An engine is contained within an engine compartment disposed rearward of the operator's compartment and includes an auxiliary hydraulic power supply driven off the engine. A pair of spaced apart actuating arms are operably coupled to the rear of the frame and have a quick attaching mount. The improvement comprises a flail mower implement that has a quick attachment receiver that is adapted for selective engagement with the quick attaching mount of the pair of actuating arms.

DETAILED DESCRIPTION OF THE DRAWINGS

DETAILED DESCRIPTION OF THE PREFERRED EMBODIMENTS

Figure 1:
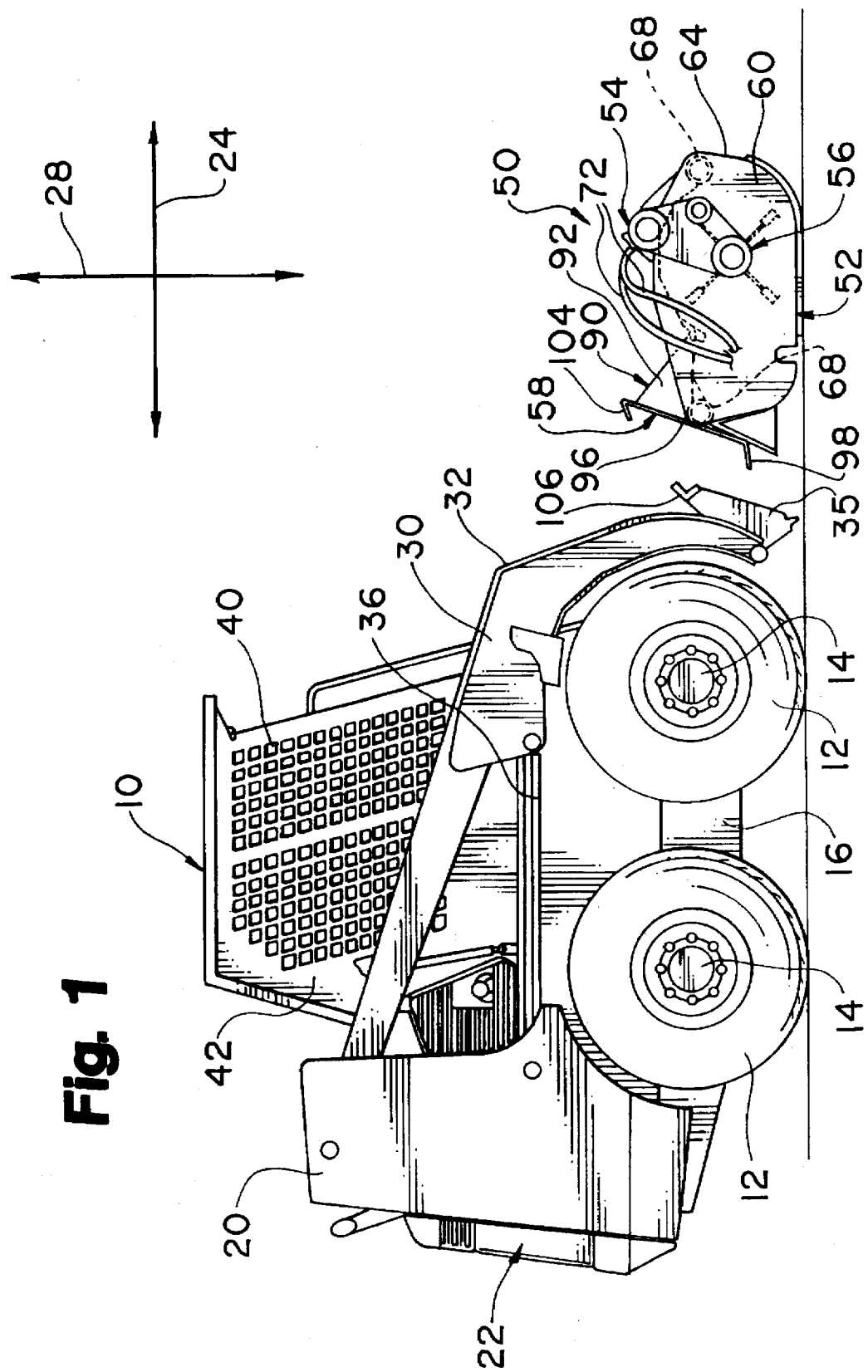
FIG. 1 is a side elevational view of a flail mower of the present invention positioned in front of a skid steer vehicle with portions of the flail apparatus depicted in phantom.
Figure 2:
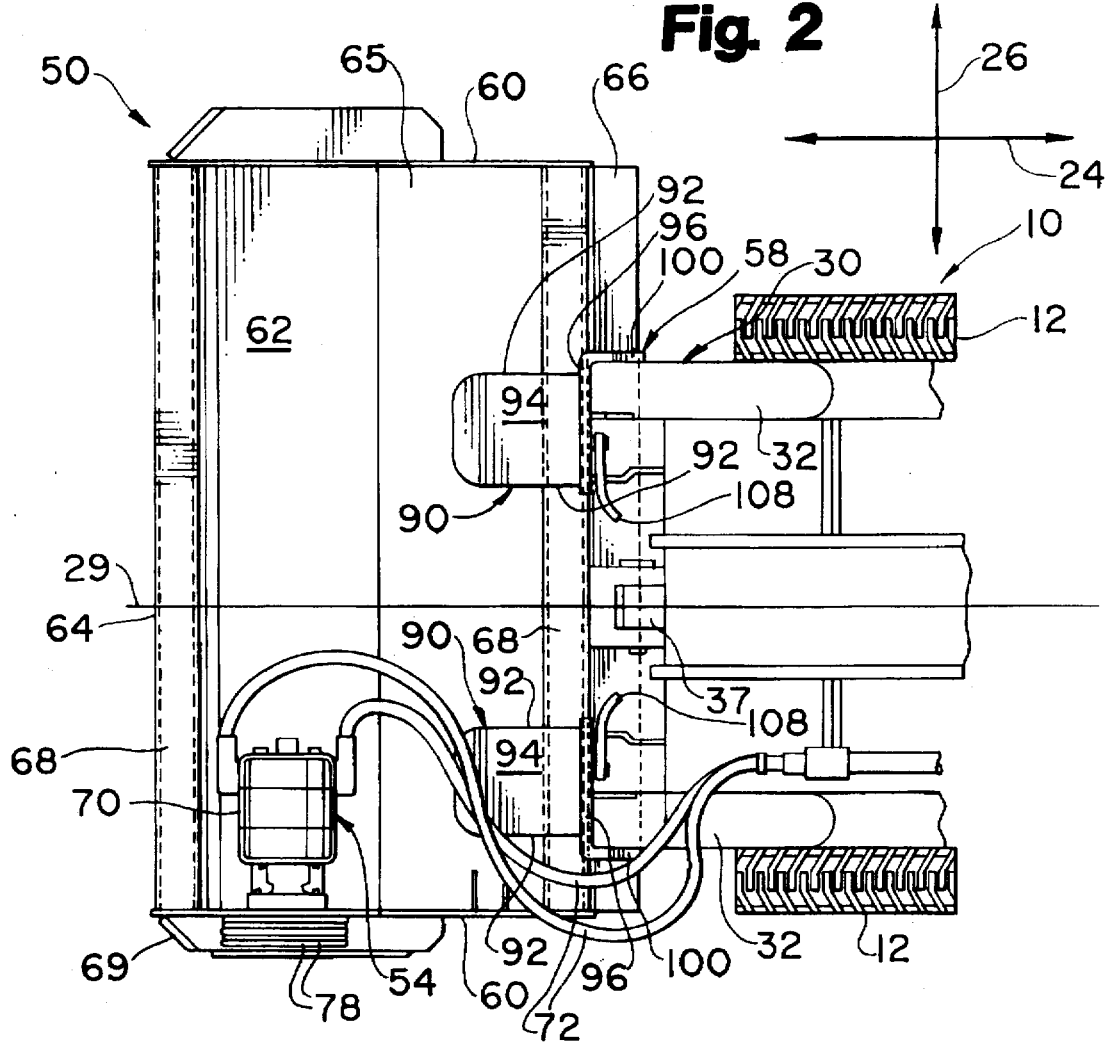
FIG. 2 is a top elevational view of the flail mower attached to the front portion of the skid steer vehicle.

A skid steer vehicle 10, which includes a flail mower attachment 50 in accordance with the present invention, is illustrated generally in FIG. 1, the flail mower attachment 50 being depicted separated from the skid steer vehicle 10 in a disposition that is typical of the disposition just prior to attaching the flail mower 50 to the skid steer vehicle 10. The skid steer vehicle 10 includes a main frame assembly 16 mounted to a lower frame assembly or transmission case (not shown), lift arm assembly 30 and operator's compartment 40. An engine compartment 22 is located at the rear of the vehicle 10. Wheels 12 are mounted to stub axles 14 and extend from both sides of the main frame assembly 16. Main frame assembly 16 defines longitudinal direction 24, transverse direction 26, and elevational direction 28, as shown in FIGS. 1–2. Additional, main frame assembly 16 defines a central axis 29 (FIG. 2).

The lift arm assembly 30 is mounted to upright members 20 which are located at the rear of the main frame assembly 16. Alternative designs of skid steer vehicles 10 do not have the prominent upright members 20, as depicted, and attach the lift arm assembly 30 to the rear of the main frame assembly 16. As shown, the lift arm assembly 30 includes a pair of lift arms 32, preferably equally spaced from central axis 29, and a front quick attachment mount 35 that is pivotally mounted to the lift arms 32. Front mounted attachments or implements, such as the flail mower 50, are mounted to the lift arm assembly 30 by means of the quick attachment mount 35. The lift arm assembly 30 is raised and lowered with respect to the main frame assembly 16 by a pair of lift cylinders 36. The attachment mount 35, and therefore the flail mower 50, are rotated with respect to lift arms 32 by tilt cylinder 37, depicted in FIGS. 2 and 4. The function of the tilt cylinder 37 may also be performed by a pair of spaced apart tilt cylinders in some skid steer vehicle 10 designs.

The operator's compartment 40 takes up substantially all of the space between the rails of the main frame assembly 16 in the mid and forward portions of the vehicle 10 and is partially enclosed by cab 42. Cab 42 is an integral unit of the vehicle 10. In some skid steer vehicles 10, the cab 42 is pivotally mounted to main frame 16. Cab 42, including the operator seat (not shown), can thereby be rotated to permit access to the rear mounted engine disposed in the engine compartment 22, the transmission case, and other mechanical and hydraulic systems disposed therein. The cab 42 may also be selectively slidable within the main frame 16 to expose the mechanical and hydraulic systems of the skid steer vehicle 10.

All operations of vehicle 10 can be controlled by an operator from within the operator's compartment 40. The hydraulic drive system of vehicle 10 includes a pair of steering levers (not shown), which are pivotally mounted on the left and right sides, respectively, of the operator's compartment 40. The levers can be independently moved in forward and rearward directions, and are biased to a central or neutral position. Actuation of the levers causes the wheels 12 on the respective side of the vehicle 10 to rotate at a speed and in a direction corresponding to the extent and direction of the controlling lever motion. The lift cylinders 36 and tilt cylinder 37 are independently actuated through movement of separate foot pedals or steering lever mounted controls (not shown) mounted toward the front of operator compartment 40. The general operation of skid steer loaders such as vehicle 10 is well known.

As depicted in FIG. 1, the flail mower 50 is resting on the ground spaced slightly apart from the skid steer vehicle 10 prior to attachment thereto. Preferably the flail mower 50 includes a flail unit 56, which preferably is an Alamo 60 inch VERSA FLAIL or an Alamo 74 inch VERSA FLAIL flail mower, made by the Alamo Company of Seguin, Tex. 78256–0549. The VERSA FLAIL flail units are specifically designed to be mounted in a cantilever manner at the rear of a tractor in a transverse orientation with respect to the center line of the tractor. In such orientation, the VERSA FLAIL flail unit is disposed to the side of the tractor, usually on a telescoping boom, and is useful primarily for cutting the vegetation in ditches alongside road beds. In such use, the tractor drives along the relatively flat surface of the road bed and the VERSA FLAIL flail unit is deployed at a downwardly directed angle along the side of the ditch next to the road bed. It will be understood that other flail units may be used as well.

The flail mower 50 has four major components: case 52, drive unit 54, flail unit 56, and quick attachment receiver 58.

Figure 3:
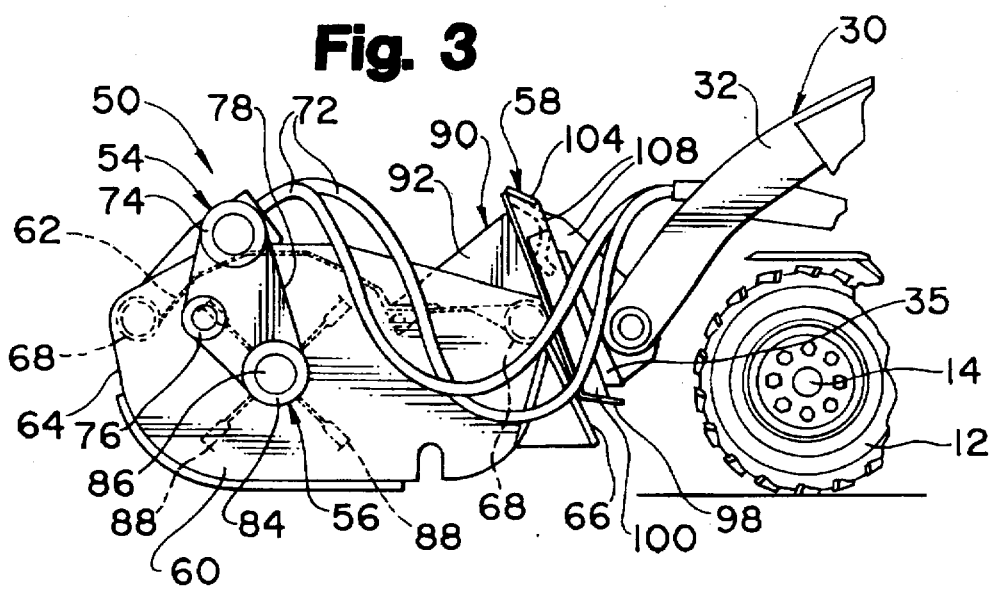
FIG. 3 is a side elevational view of the flail mower with portions of the flail apparatus depicted in phantom attached to the front portion of the skid steer vehicle.

The case 52 of the flail mower 50 has two opposed side panels 60, a top panel 62, a front panel 64, and a rear panel 66 and a rear subpanel 65 extending between top panel 62 and rear panel 66. Rear subpanel 65 includes a plurality of surfaces 67 extending in the lateral direction and angled relatively to each other, as shown in e.g. FIG. 4. Portions of the opposed side panels 60 project above the upper surface of the top panel 62. The underside of the case 52 is generally open to present the vegetation to the cutting blades of the flail unit 56. Front and rear structural tubes 68 are welded to the case 52. The structural tubes 68 enhance the stiffness case 52. A removable drive cover 69 is mounted on the left side of the case 52 as depicted in FIGS. 2 and 3. The case 52 is preferably formed from steel sheets having a thickness of approximately ⅜ of an inch.

The drive unit 54 has a hydraulic motor 70 that is coupled by hydraulic lines 72 to the auxiliary hydraulic system of the skid steer vehicle 10. The hydraulic lines 72 terminate in quick disconnect type couplers for coupling to the auxiliary hydraulic system. A first hydraulic line 72 provides hydraulic fluid under pressure to power the hydraulic motor 70 and a second hydraulic line 72 provides a vehicle for the return of hydraulic fluid to the auxiliary hydraulic system of the skid steer vehicle 10.

The hydraulic motor 70 has a rotatable output shaft (not shown) that is coupled to the drive pulley 74. The drive pulley 74 preferably has two grooves defined therein to accommodate two drive belts 78. An idler pulley 76 rotatably mounted to the side panel 60 of the case 52 is utilized to maintain the desired tension in the drive belts 78. The drive pulley 74, idler pulley 76 and drive belts 78 are substantially enclosed within the drive cover 69.

The hydraulic motor 70 is affixed to the inwardly directed portion of the surface of the side panel 60 that projects above the upper surface of the top panel 62 and is mounted thereon by bolts. A bore (not shown) is defined in the side panel 60 to accommodate the passage of the output drive shaft of the hydraulic motor 70 therethrough.

The hydraulic motor 70 is selected to provide an adequate rotational speed of the flail unit 56 with the amount of hydraulic fluid available from the auxiliary hydraulic system of the skid steer vehicle 10. In a preferred embodiment, the hydraulic motor 70 is capable of rotating the flail unit 56 at a rotational speed of between 1,200 and 1,800 rpm with a desired speed of approximately 1,600 rpm.

The drive belts 78 of the drive unit 54 are rotationally coupled to the flail pulley 84 of the flail unit 56. The flail pulley 84 is fixedly coupled to a rotatable drive shaft 86. The drive shaft 86 spans the full width of the flail mower case 52 and is borne by bearing units (not shown) disposed within bores defined in the opposed side panels 60 of the flail mower case 52.

As depicted in FIG. 3, a plurality of hammers 88 are coupled to the drive shaft 86. Each of the hammers 88 contains one or more sharpened blades disposed at the distal end of the hammers 88. The hammers 88 have a freely pivoting-type coupling to the drive shaft 86, such that the hammers 88 swing freely and comprise the flail portion of the flail unit 56. The cutting mechanism of flail type mowers is known.

As best viewed in FIG. 3, the quick attachment receiver 58 is closely coupled to the flail mower 50 in order to minimize the forward projection of the flail mower 50 when attached to the skid steer vehicle 10. The close coupling has the effect of minimizing the moment that the flail mower 50 imparts to the skid steer vehicle 10 when the flail mower 50 is supported by the lift arms 32.

The quick attachment receiver 58 includes and is supported on a pair of spaced apart gussets 90. The gussets 90 each have a pair of spaced apart generally triangular-shaped side plates 92 and an enclosing top plate 94. The gussets 90 may be formed from a single plate of steel in a brake or press or may be formed by welding the side plates 92 and the top plate 94.

A first edge of the side plates 92 of the gusset 90 is welded to portions of the upper surface of the rear subpanel 65 of the case 52 and to the rear most structural tube 68. The edge margin of a second side of the side plates 92 is welded to a back plate 96, with a back plate 96 being supported by each gusset 90. Alternatively, a single, larger back plate 96 is utilized. The single back plate 96 spans the full distance spanned between the outer edges of the two back plates 96 that are depicted. The single back plate 96 is supported by both the gussets 90, as previously described.

Figure 4:
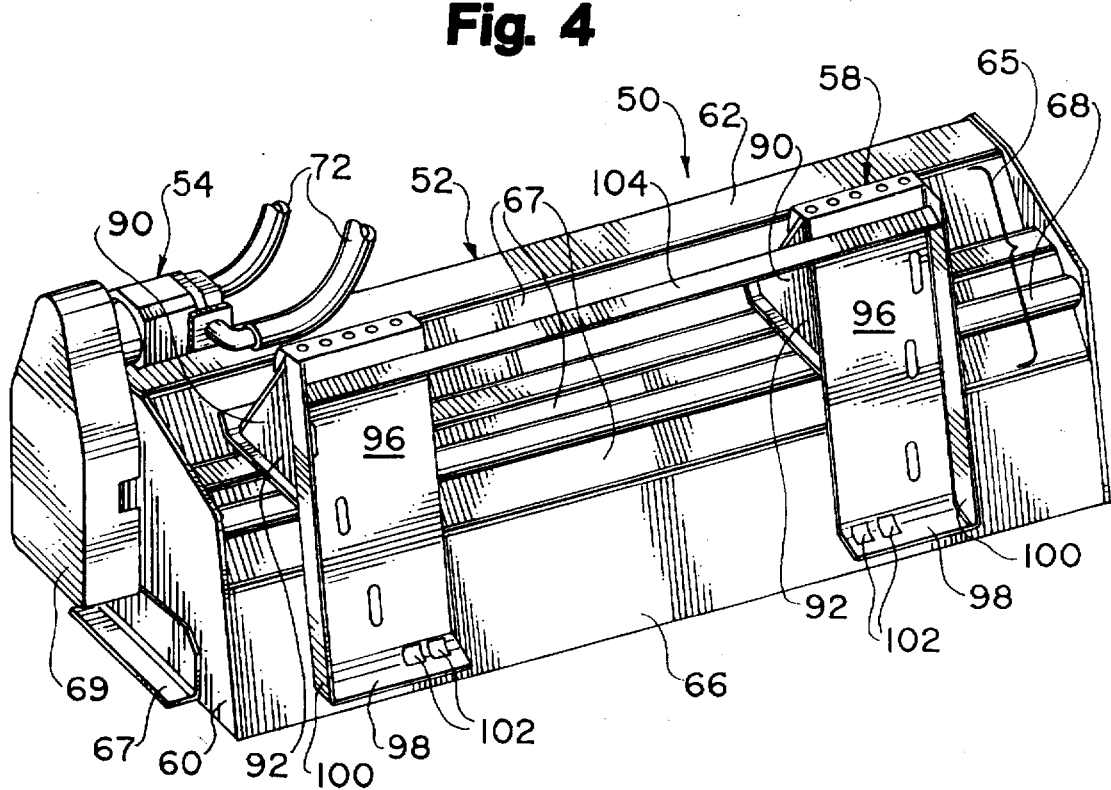
FIG. 4 is a rear perspective view of the flail mower and the quick attachment receiver thereof.

The two back plates 96 are formed in a generally rectangular shape. The upper portion of the back plate 96 is welded to the gusset 90 as previously described. The lower portion of the back plate 96 is welded to the rear panel 66 of the case 52. The lower margin of the back plate 96 is bent upward as depicted in FIGS. 3 and 4 to define a bottom receiver 98. The bottom receiver 98 preferably defines an obtuse included angle with respect to the back plate 96. A guide plate 100 is formed or welded transverse to the outwardly directed margin of each of the back plates 96. The guide plate 100 extends between a portion of the bottom receiver 98 and the back plate 96. At least one locking device hole 102 is defined in each of the bottom receivers 98. The locking device hole 102 is preferably defined in the bottom receiver 98 with an edge thereof disposed proximate the bend defining the juncture between the back plate 96 and the bottom receiver 98.

As viewed in FIG. 3, the two back plates 96 are disposed with respect to the quick attachment mount 35 of the lift assembly 30 with the upper margin thereof tilted away from the quick attachment mount 35. This disposition results in the weight bearing upper portion of the quick attachment mount 35 overlying the case 52 of the flail mower 50 when engaged therewith. This disposition effectively minimizes the moment presented by the flail mower 50 to the skid vehicle 10.

A wedge bar 104 is welded to each of the back plates 96 proximate the upper margin thereof. The wedge bar 104 preferably forms an acute angle with respect to the back plate 96 that defines a downwardly directed lip. As depicted in FIG. 4, the wedge bars 104 for each of the back plates 96 is comprised of a single bar that spans the distance between the two gussets 90, but could as well be individual wedge bars 104 welded to each of the back plates 96.

As depicted in FIGS. 3 and 4, the quick attachment receiver 58 is mounted to the flail mower 50 offset to the left. The offset mounting causes the flail mower 50 to project to the right of the skid steer vehicle 10 when attached thereto. Such projection facilitates the mowing of vegetation that is growing close to a structure on the right side of the skid steer vehicle 10 without causing the skid steer vehicle 10 to strike the structure. It may also be desirable to mount the flail mower 50 centered on the skid steer vehicle 10. A flail mower 50 having greater width than the depicted flail mower 50 would then project on both sides of the skid steer vehicle 10.

As best seen in FIGS. 1 and 3, the upper margin 106 of the quick attaching mount 35 engages the underside of the wedge bar 104 in a wedged fit. The wedged fit comprises the load bearing connection between the mower 50 and the skid steer vehicle 10. Since the load bearing connection point overlies a portion of the flail mower 50, only the portion of the mass of the flail mower 50 that is disposed forward of the load bearing connection point is available to generate a destabilizing moment about the load bearing connection point.

The flail mower 50 may be readily raised with only the aforementioned wedged fit effected between the flail mower 50 and the skid steer vehicle 10. However, in order to ensure that the flail mower 50 is locked in place, rotation of the over-center levers 108 of the quick attaching mount 35 drives spring loaded pins or hooks (not shown) into locking engagement with the locking device holes 102 defined in the bottom receiver 98. The quick attaching mount 35 is locked to the quick attachment receiver 58 in a manner as disclosed in U.S. Pat. No. 3,672,521 to Bauer et al. Since the expiration of the '521 patent, such a quick attaching mount 35 has become widely used in the skid steer vehicle market by the manufacturers of the majority of the skid steer vehicles sold.

In operation, as shown in FIG. 1, the flail mower 50 is supported on the ground surface prior to attaching to the skid steer vehicle 10. The skid steer vehicle 10 is positioned so that the upper margin 106 of the quick attaching mount 35 is adjacent to the wedge bar 104 of the mower 50. The tilt cylinder 37 is then extended to rotate the quick attaching mount 35 clockwise, as depicted in FIG. 1, with respect to the frame assembly 16 so that the upper margin 106 is in position to engage the overhanging lip defined by the wedge bar 104 of the quick attachment receiver 58. From this position, the lift cylinders 36 are extended to raise the lift arms 32 and engage the underside of the wedge bar 104 with the upper margin 106, thereby forming the load bearing connection as seen in FIG. 3. The over-center levers 108 of the quick attaching mount 35 are then manually actuated to drive locking elements such as spring-loaded pins or hooks into locking engagement with the locking device holes 102 defined in the bottom receiver 98, thereby locking the mower 50 to the skid steer vehicle 10. The hydraulic lines 72 are then connected to the auxiliary hydraulic system of the skid steer vehicle 10 by means of the quick disconnect type couplers.

Once attached to the skid steer vehicle 10, the flail mower 50 may be elevated as desired and rotated from the horizontal disposition in order to best perform the mowing operations. The auxiliary hydraulic system of the skid steer vehicle 10 is powered on and off as desired to power the drive unit 54 and engage the flail unit 56 of the flail mower 50.

Detachment of the flail mower 50 from the skid steer vehicle 10 is simply accomplished by reversing the above described procedure.

The present invention provides a safe mowing capability for a skid steer vehicle. Skid steer vehicles are very versatile and a wide variety of attachments or implements have been adapted for use with skid steer vehicles as previously mentioned. There is a need for the safest possible mowing capabilities at a construction site. Adaption of a flail mower implement to a skid steer vehicle has until now been overlooked largely because of the unorthodox steering arrangement of the skid steer vehicle. The present invention is simply constructed and adds a new degree of usefulness to the skid steer vehicle, which will result in improved efficiencies and cost reduction in site preparation in the safest possible manner.

Although the present invention has been described with reference to preferred embodiments, workers skilled in the art will recognize that changes may be made in form and detail without departing from the spirit and scope of the invention.

What is claimed is:

1. A skid steer vehicle, comprising:

a main frame, the main frame defining a longitudinal direction, a lateral direction transverse to the longitudinal direction, and an elevational direction transverse to the longitudinal direction and the lateral direction;

wheels operably coupled to the main frame to support the main frame for movement over the ground;

an operator's station supported by the main frame;

an engine compartment disposed rearwardly of the operator's station in the longitudinal direction;

an engine disposed within the engine compartment;

a hydraulic power supply driven off the engine;

a pair of spaced actuating arms operably coupled to the main frame and extending forwardly of the operator's station in the longitudinal direction;

a quick-attaching mount operably coupled to the pair of spaced actuating arms; and a flail mower implement supportable on the pair of spaced actuating arms by the quick-attaching mount, the flail mower implement comprising:

a quick-attaching receiver readily connectable to and readily disconnectable from the quick-attaching mount;

a pair of side walls defining opposite outer sides of the flail mower implement;

a top wall extending between the side walls, one of the side walls defining a first bore therethrough disposed above the top wall;

a rear panel extending between the side walls;

a rear subpanel extending between the top wall and the rear panel, the quick-attaching receiver being disposed on the rear subpanel; and a hydraulic motor having an output drive shaft for powering the flail mower implement via a drive arrangement, the output drive shaft extending through the first bore to avoid penetration of the top wall.

2. The skid steer vehicle of claim 1, wherein:

the flail mower implement comprises a flail drive shaft driven by the hydraulic motor via the drive arrangement;

the one side wall defines a second bore therethrough disposed below the top wall; and one of the flail drive shaft and the drive arrangement extends within the second bore.

3. The skid steer vehicle of claim 2, wherein:

said one side wall comprises an inward side and an outward side, the hydraulic motor being disposed on the inward side of said one side wall;

the drive arrangement comprises a belt and pulley arrangement, the hydraulic motor powering the flail mower implement via the belt and pulley arrangement; and the flail mower implement further comprises a drive cover disposed on the outward side of said one side wall, the drive cover housing the belt and pulley arrangement.

4. The skid steer vehicle of claim 1, wherein:

the quick-attaching mount comprises at least one locking element; and the quick-attaching receiver comprises at least one back plate extending in the lateral direction, the back plate having a lower end bent upwardly to define an obtuse included angle between the lower end and the remainder of the back plate, the back plate including at least one locking hole having an edge proximate the bend, the locking hole being constructed to receive the locking element of the quick-attaching mount.

5. The skid steer vehicle of claim 4, wherein the at least one back plate comprises two back plates spaced apart in the lateral direction, the back plates having lateral outside edges, the quick-attaching receiver further comprising guide plates attached to the back plates along the lateral outside edges of the back plates, the guide plates extending in the longitudinal direction perpendicular to the back plates.

6. The skid steer vehicle of claim 5, wherein the flail mower implement further comprises two gusset plates attached to and extending between the back plates and the top panel of the flail mower implement.

7. The skid steer vehicle of claim 4, further comprising a wedge bar extending along the top of the at least one back plate, the wedge bar defining an acute angle with respect to the at least one back plate for receiving the quick-attaching mount.

8. A skid steer vehicle, comprising:

a main frame, the main frame defining a longitudinal direction, a lateral direction transverse to the longitudinal direction, an elevational direction transverse to the longitudinal direction and the lateral direction, and a central axis extending in the longitudinal direction;

wheels operably coupled to the main frame to support the main frame for movement over the ground;

an operator's station supported by the main frame;

an engine compartment disposed rearwardly of the operator's station in the longitudinal direction;

an engine disposed within the engine compartment;

a pair of spaced actuating arms operably coupled to the main frame and extending forwardly of the operator's station in the longitudinal direction, the arms being equally spaced from the central axis;

a quick-attaching mount operably coupled to the pair of spaced actuating arms; and a flail mower implement supportable on the pair of spaced actuating arms by the quick-attaching mount, the flail mower implement having a quick-attaching receiver that is readily connectable to and readily disconnectable from the quick-attaching mount, the quick-attaching receiver being disposed on the flail mower implement in an offset position in the lateral direction;

wherein the flail mower implement, when supported by the pair of spaced actuating arms, extends forwardly of the arms in the longitudinal direction and projects in the lateral direction more to one side of the quick-attaching mount than to the other side of the quick-attaching mount.

9. The skid steer vehicle of claim 8, wherein:

the quick-attaching mount defines a central axis extending in the longitudinal direction, the central axis of the quick-attaching mount being disposed centrally between opposite lateral sides of the quick-attaching mount;

the flail mower implement defines a central axis extending in the longitudinal direction, the central axis of the flail mower implement being disposed centrally between opposite lateral sides of the flail mower implement; and the central axis of the flail mower implement is offset in the lateral direction from the central axis of the quick-attaching mount.

10. The skid steer vehicle of claim 8, further comprising:

a hydraulic power supply driven off the engine;

a hydraulic motor supported by the flail mower implement and being driven off of the hydraulic power supply; and a plurality of hydraulic lines extending between the hydraulic motor supported by the flail mower implement and the hydraulic power supply driven off the engine, the hydraulic lines being readily connectable and disconnectable between the hydraulic motor and the hydraulic power supply.

11. The skid steer vehicle of claim 8, wherein the flail mower implement further comprises:

a pair of side walls;

a top wall extending between the side walls, one of the side walls defining a bore disposed therethrough above the top wall, the quick-attaching receiver being disposed in a position off the top wall; and a hydraulic motor having an output drive shaft for powering the flail mower implement via a drive arrangement, the output drive shaft extending through the bore to avoid penetration of the top wall.

12. A skid steer vehicle, comprising:

a main frame, the main frame defining a longitudinal direction, a lateral direction transverse to the longitudinal direction, and an elevational direction transverse to the longitudinal direction and the lateral direction;

wheels operably coupled to the main frame to support the main frame for movement over the ground;

an operator's station supported by the main frame;

an engine compartment disposed rearwardly of the operator's station in the longitudinal direction;

an engine disposed within the engine compartment;

a pair of spaced actuating arms operably coupled to the main frame and extending forwardly of the operator's station in the longitudinal direction;

quick-attaching mount means, coupled to the pair of spaced actuating arms, for mounting an implement on the pair of spaced actuating arms;

flail mower implement means for being supported on the pair of spaced actuating arms by the quick-attaching mount means, the flail mower implement means having a quick-attaching receiver means for being readily connectable to and readily disconnectable from the quick-attaching mount means, the quick-attaching receiver means being disposed on the flail mower implement means in an offset position in the lateral direction;

wherein the flail mower implement means, when supported by the pair of spaced actuating arms, extends forwardly of the arms in the longitudinal direction and projects in the lateral direction more to one side of the quick-attaching mount means than to the other side of the quick-attaching mount means;

wherein the flail mower implement means further comprises:

a pair of side walls defining opposite outer sides of the flail mower implement means;

a top wall extending between the side walls, one of the side walls defining a bore therethrough disposed above the top wall, the quick-attaching receiver means being disposed in a position off the top wall; and drive means for powering the flail mower implement means, the drive means comprising a hydraulic motor having an output drive shaft extending through the bore to avoid penetration of the top wall.

13. The skid steer vehicle of claim 12, wherein:

said one side wall comprises an inward side and an outward side, the hydraulic motor being disposed on the inward side of said one side wall;

the flail mower implement means further comprises a flail drive shaft, the drive means powering the flail drive shaft;

the drive means comprises a belt and pulley arrangement; and the flail mower implement means further comprises a drive cover disposed on the outer side of said one side wall, the drive cover housing the belt and pulley arrangement.

14. The skid steer vehicle of claim 12, wherein:

the flail mower implement means further comprises a flail drive shaft, the drive means powering the flail drive shaft;

said one side wall defines a second bore therethrough disposed below the top wall; and one of the drive means and the flail drive shaft extends within the second bore.

15. The skid steer vehicle of claim 12, wherein:

the quick-attaching mount means defines a central axis extending in the longitudinal direction, the central axis of the quick-attaching mount means being disposed centrally between opposite lateral sides of the quick-attaching mount means;

the flail mower implement means defines a central axis extending in the longitudinal direction, the central axis of the flail mower implement means being disposed centrally between opposite lateral sides of the flail mower implement means; and the central axis of the flail mower implement means is offset in the lateral direction from the central axis of the quick-attaching mount means.

16. A flail mower implement supportable by a quick-attaching mount on a pair of spaced actuating arms of a skid steer vehicle, the flail mower implement comprising:

a quick-attaching receiver readily connectable to and readily disconnectable from the quick-attaching mount;

a pair of side walls defining opposite outer sides of the flail mower implement;

a top wall extending between the side walls, one of the side walls defining a first bore therethrough disposed above the top wall;

a rear panel extending between the side walls;

a rear subpanel extending between the top wall and the rear panel, the quick-attaching receiver being disposed on the rear subpanel; and a hydraulic motor having an output drive shaft for powering the flail mower implement via a drive arrangement, the output drive shaft extending through the first bore to avoid penetration of the top wall.

17. The flail mower implement of claim 16, wherein:

the quick-attaching mount comprises at least one locking element; and the quick-attaching receiver comprises at least one back plate extending in a lateral direction, the back plate having a lower end bent upwardly to define an obtuse included angle between the lower end and the remainder of the back plate, the back plate including at least one locking hole having an edge proximate the bend, the locking hole being constructed to receive the locking element of the quick-attaching mount.

18. A flail mower implement supportable by a quick-attaching mount on a pair of spaced actuating arms of a skid steer vehicle, the arms being equally spaced from a central axis of a main frame of the skid steer vehicle, the flail mower implement comprising:

a quick-attaching receiver that is readily connectable to and readily disconnectable from the quick-attaching mount, the quick-attaching receiver being disposed on the flail mower implement in an offset position in a lateral direction of the flail mower of the skid steer vehicle;

wherein the flail mower implement, when supported by the pair of spaced actuating arms, extends forwardly of the arms in a longitudinal direction of the skid steer vehicle and projects in the lateral direction more to one side of the quick-attaching mount than to the other side of the quick-attaching mount.

19. The flail mower implement of claim 18, further comprising:

a pair of side walls;

a top wall extending between the side walls, one of the side walls defining a bore disposed therethrough above the top wall; and a hydraulic motor having an output drive shaft for powering the flail mower implement via a drive arrangement, the output drive shaft extending through the bore to avoid penetration of the top wall.

20. The skid steer vehicle of claim 1, wherein the rear subpanel includes a plurality of surfaces extending in the lateral direction and angled relatively to each other.

* * * * *

UNITED STATES PATENT AND TRADEMARK OFFICE
CERTIFICATE OF CORRECTION

PATENT NO. : 5,666,794
DATED : September 16, 1997
INVENTOR(S) : Vought et al.

It is certified that error appears in the above-identified patent and that said Letters Patent is hereby corrected as shown below:

Column 3, line 44, delete "Additional," and insert --Additionally,--.

Column 4, line 58, after "stiffness" insert --of the--.

Column 9, line 40 delete "the-longitudinal" and insert --the longitudinal--.

Signed and Sealed this

Seventeenth Day of March, 1998

Attest:

BRUCE LEHMAN

*Attesting Officer*    *Commissioner of Patents and Trademarks*